United States Patent

LeHenaff

[15] 3,641,378
[45] Feb. 8, 1972

[54] ARRANGEMENT FOR SECURING CONDUCTORS OF STATOR WINDING OF DYNAMOELECTRIC MACHINE

[72] Inventor: Jacques LeHenaff, Paris, France
[73] Assignee: Compagnie Electro-Mecanique, Paris, France
[22] Filed: May 22, 1970
[21] Appl. No.: 39,760

[30] Foreign Application Priority Data

May 29, 1969 France..................................6917390

[52] U.S. Cl. ............................................310/214, 310/196
[51] Int. Cl. .........................................................H02k 3/48
[58] Field of Search............................................310/214, 192

[56] References Cited

UNITED STATES PATENTS 3,235,761 2/1966 Nohen..............................310/192 X Primary Examiner—D. X. Sliney
Attorney—Pierce, Scheffler & Parker

[57] ABSTRACT

An arrangement for securing the conductor bars of a distributed winding in place on the magnetic circuit of the stator element of a dynamoelectric machine is constituted by spaced-apart insulating pieces each including a heel portion engaged in a complementary configured recess in the stator iron and two tapered lateral projections which bear against the conductor bars only along tapered sides of the latter. The central surface portion of each conductor bar oriented towards the gap between the stator and rotor elements is left exposed. The advantage of the arrangement is that it enables the conductor bars to be brought closer to the rotor.

6 Claims, 5 Drawing Figures

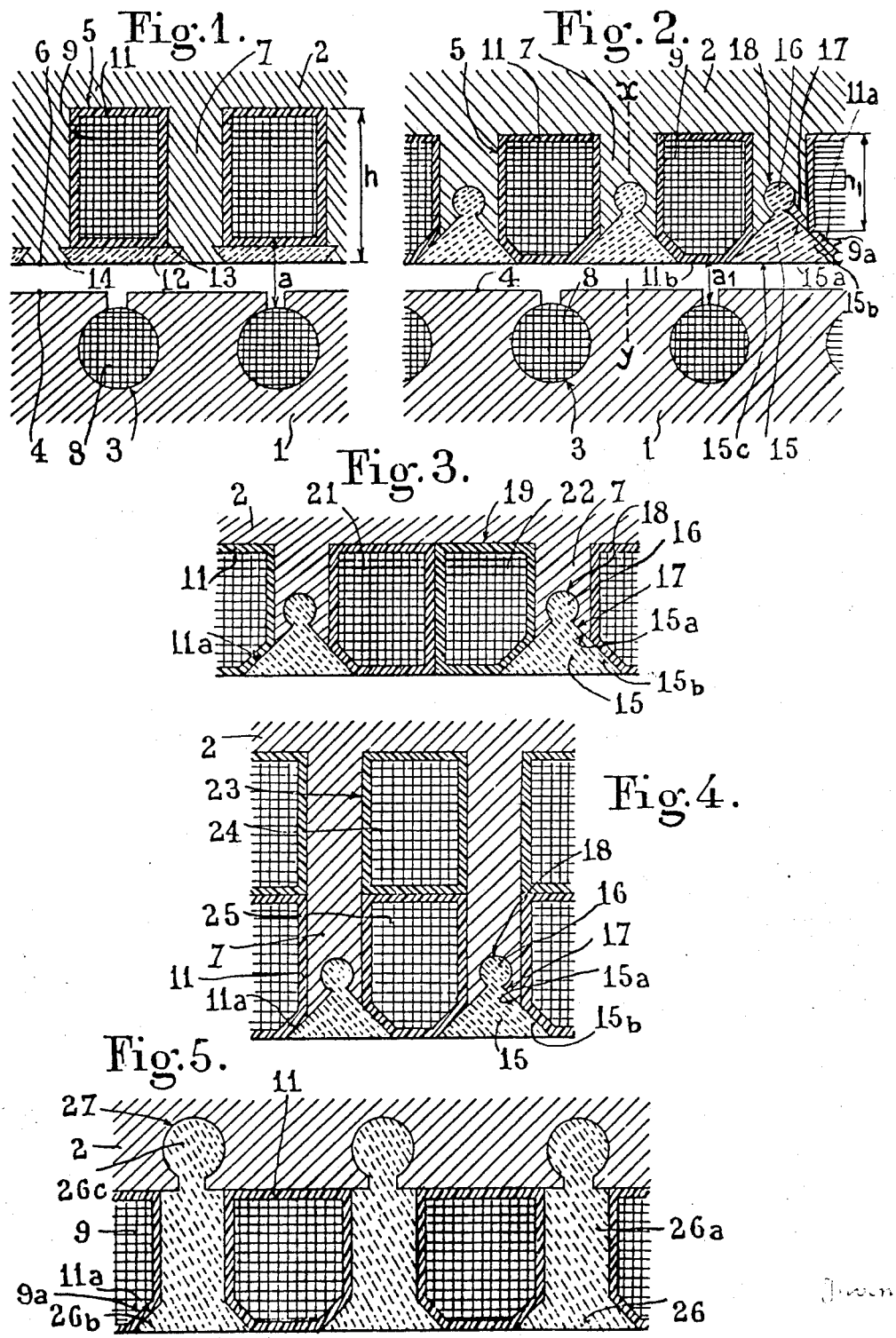

ARRANGEMENT FOR SECURING CONDUCTORS OF STATOR WINDING OF DYNAMOELECTRIC MACHINE

This invention relates to an improved mode for securing the active electrical conductors of a winding distributed on the magnetic circuit of the stator element of a dynamoelectric machine such as an electrical generator or motor.

It is known that the active conductors of such a distributed winding are generally lodged in slots extending generally parallel with the axis of the machine, and that the conductors are retained in their slots by means of chocks which are made from insulating material and sometimes from metal.

This known mode for securing the conductors in the stator slots does not permit, by reason of the thickness of the chocks and the height of the attachment hooks of the chocks on the teeth of the magnetic circuit, bringing the conductors very close to the gap between the stator and rotor. Consequently the conductors remain recessed in the slots relatively far away from the cylindrical inner surface of the stator.

It results that, when the conductors are traversed by currents a fairly large number of flux lines is enclosed directly around these conductors without traversing the gap and consequently without producing a flux linkage with the conductors of the revolving rotor. This fact results in a more or less high value of self-inductance of the leakage of each of the windings present with respect to one another.

This notion of self-inductance of the leakage take on a particular significance in the case of alternating current machines where one designates under the term leakage reactance, the product of the self-inductance by the pulsation of the currents. The leakage reactance which has an intrinsic magnitude related to the geometry of the slots contributes to defining certain essential electrical characteristics of the machine such as internal voltage drop, dynamic stability and the short circuit current. In certain cases, where particular operating conditions are sought, such as small voltage drop, good stability, and high short circuit current, it can be useful to reduce the leakage reactance to a small value. For this it is necessary to bring the conductors in the stator as near as possible to the zone where the energy exchanges occur, i.e., at the gap between rotor and stator.

The object of the present invention is to provide an improved mode for securing the conductors in the stator slots by means which are relatively simple and which enable the conductors to be located very close to the gap. To this end, each of the conductors, or conductor bundles is maintained in its slot in the stator only along the two edges of its surface turned towards the gap, so as to leave exposed the central part of this surface.

Another object of the invention is to provide an improved mode for retaining conductors in the bottom of the stator slots by means of lateral insulating pieces fixed in the magnetic circuit of the stator between the various conductors and having, in their parts near the gap, lateral projections which press against the conductors only along their edges, thus leaving the central parts of the conductor surfaces oriented towards the gap.

The improved mode for securing the conductors in their slots offers the advantage that the lateral insulating pieces used to secure the conductors in their slots do not involve addition of any further thickness to the interval included between the conductors and the gap. By this fact, the distance between conductors of the stator and those of the rotor is smaller than in the case of a dynamoelectric machine in which the conductors are fixed in their slots in a classical manner, and therefore the leakage reactance is reduced.

The mode of fixing the conductors in their slots in accordance with the invention also results in a certain reduction in the height of the teeth established by adjacent slots, this reduction exerting a favorable influence on the reduction of the self-inductance of the leakage of the slot conductors.

Various embodiments of the invention will now be described in a nonlimiting manner with reference to the accompanying drawings in which they are illustrated.

FIG. 1 is a view in developed transverse section of a part of the stator and rotor of a dynamoelectric machine in which the stator conductors are fixed in a classical, i.e., prior known manner.

FIGS. 2 to 5 are views similar to FIG. 1 but illustrating various modes of slot conductor fixation in accordance with the invention.

With reference now to FIG. 1, there is depicted a part of the rotor 1 and stator 2 of a dynamoelectric machine in which the rotor and stator conductors are lodged in their slots in a prior known manner. The rotor 1 is provided with slots 3 of a circular cross section extending longitudinally of the rotor axis opening in its cylindrical exterior surface 4. In the same manner, the stator 2 is provided with longitudinally extending slots 5 having a rectangular cross section which open in the inner cylindrical surface 6 of the stator and which delimit between them the stator teeth 7 having a height $h$.

Rotor 1 is assumed to be of the type having a distributed winding and comprises in each slot 3 an active conductor 8. In the same manner, stator 2 is provided with a stator winding composed of an active conductor 9 (or a bundle of conductors) lodged in each longitudinally extending slot 5. Each active conductor 9 is surrounded by insulation 11.

The prior known mode of securing the stator conductors 9 in their slots 5 includes chocks 12 of insulating material, the chocks having a trapezoidal cross section which engage longitudinal grooves 13 formed in the extreme outer ends of the teeth 7 and delimiting, at the extremities of these teeth attachment hooks 14 for the chocks 12. In other words the chocks 12 are thus fixed in place at the sides of the teeth by dovetail assemblies. With this mode of securing the conductors 9, a relatively large distance $a$ is established between the rotor conductors 8 and the stator conductors 9 which results in a substantial leakage reactance, as was previously explained.

One embodiment of the improved mode for securing the conductors of the stator winding in their respective slots in accordance with the invention is depicted in FIG. 2. In this figure, as well as in FIGS. 3 to 5, corresponding components have been designated with the same reference numerals as those used in FIG. 1. In FIG. 2, the stator conductors 9 are secured within their respective slots 5 by lateral insulating pieces 15 of generally prismatic configuration and a triangular cross section which extend longitudinally of the slots. These insulating pieces 15 may be magnetic or nonmagnetic and each has a radial plane of symmetry $xy$. Each piece 15 is extending by a cylindrical heel 16 having a circular cross section whose axis is contained in the plane of symmetry $xy$. Also, each tooth 7 of stator 2 has a height $h_1$ smaller than the height $h$ of the rectangular teeth 7 represented in FIG. 1. Each tooth 7 in FIG. 2 is formed with a V-shaped groove 17 in its frontal part, i.e., the part turned towards the gap between rotor and stator, in which is engaged a tapered part 15a of the lateral surface of the prismatic piece 15. The bottom of this V-shaped groove opens to a circular throat 18 sized to and which receives the heel 16 of piece 15. Also, the tapered part 15b of the lateral surface of the prismatic piece 15 projecting outside the V-shaped groove 17 bears against the slightly tapered edge 9a of conductor 9 which projects radially inward beyond the open end of the slot. In this manner, the prismatic piece 15 anchored in the iron of stator 2 by its heel 16 lodged in throat 18 bears by its lateral tapered wall 15b on a tapered surface of conductor 9, thus to hold the conductor in slot 5.

By virtue of the fact that the pieces 15 are wedged in the teeth 7 of the stator 2, each pair of adjacent pieces 15 delimit, between their facing longitudinal edges, a space in which is lodged the frontal part 11a of insulation 11 which is thus flush with the bases 15c of the prismatic pieces 15. The result of this arrangement is that distance $a_1$ between conductors 8 and 9 of the rotor and stator respectively is smaller than the corresponding distance $a$ (in FIG. 1) obtained with the prior known mode of securing the stator conductors in their slots, this being due to elimination of the chocks 12. This reduction of the distance $a_1$ involves correspondingly a reduction in leakage reactance. Also, the reduction in height $h$ of teeth 7 exerts a favorable influence on the reduction in self-inductance of conductors 9.

The pieces 15 which ensure security of the stator conductors 9 can have a cross section other than the triangular configuration depicted in FIG. 2. All that is necessary is that each piece be provided with a heel by which it can be wedged in the iron teeth on the stator and with lateral projections which engage and hold each insulated conductor 9 in its slot 5.

FIG. 3 illustrates an application of the principle depicted in FIG. 2 to hold, in the same slot 19, two juxtaposed insulated conductors 21 and 22. In this case, each conductor 21, 22 has a single truncated edge which engages the external surface part 15b of the lateral wall of the adjacent prismatic piece 15.

FIG. 4 illustrates an application of the principle depicted in FIG. 2 to hold, in the same slot 25, two superposed conductors 24, 25. In this case, the innermost conductor 24 has a rectangular cross section and the outermost conductor 25 has two truncated edges in contact with the surface portions 15b of the lateral walls of two adjacent pieces 15.

FIG. 5 illustrates an application of the principle depicted in FIG. 2 which makes it possible to completely eliminate the iron teeth of the stator. In this case, each insulating piece 26 comprises a central part 26a having a rectangular cross section, an outer part 26b having a trapezoidal cross section, and an inner part 26c of circular cross section which is lodged within a throat 27 of the same size and configuration provided in the iron of the stator. Thus the circumferentially spaced insulating pieces 26 project from the internal, nontoothed cylindrical surface of the stator and each trapezoidal part 26b secures the corresponding sides of two adjacent conductors 9 as in the case of the embodiment according to FIG. 2. The mode of securing the stator conductors in slots established between adjacent insulating pieces 26 as depicted in FIG. 5 thus permits one to increase the distance between the iron in the rotor and stator components of the machine.

The insulating pieces 15 can be of a small axial length, or they can be quite long, according to manufacturing requirements. The insulating property of the pieces 15 prevents them from becoming the seat of currents induced in parallel in the slot conductors.

The lateral pieces can be made from other than insulating material; in this case insulation in the longitudinal direction can be obtained by the use of pieces of metallic foil, insulated on their faces and glued, the metal being magnetic or nonmagnetic.

In conclusion it is also evident that other forms of execution of the invention can be developed from the principles disclosed in the application without imposing a limitation on the scope of the invention as defined in the appended claims.

1. An arrangement for securing the conductors of a distributed winding in place within slots formed respectively between adjacent teeth provided on the stator element of a dynamoelectric machine and which open in the direction of the rotor which comprises an insulating piece individual to each of said stator teeth, each said insulating piece including a heel portion extending longitudinally of the corresponding stator tooth and which is secured within a complementary configured recess within the tooth and two tapered lateral projections also extending longitudinally of the stator tooth and engaged respectively with like tapered portions of the conductor winding extending radially inward beyond the open ends of adjacent slots.

2. An arrangement as defined in claim 1 for securing stator conductors in place within the stator slots wherein each said insulating piece is constituted by a prism having a tapered cross section depending from the heel portion thereof and which forms said tapered lateral projections, a portion of said tapered lateral projections being engaged with the sides of a V-shaped groove formed in the frontal face of each tooth, and another portion of said tapered lateral projection being engaged with said radially inward extending tapered portions of said conductor winding in adjacent slots.

3. An arrangement as defined in claim 2 wherein the radially inner portions of said insulating pieces terminate flush with the radially inward ends of the conductor windings in the slots.

4. An arrangement for securing the conductors of a distributed winding in place on an inner toothless surface provided on the stator element of a dynamoelectric machine, said toothless surface extending substantially 360° about the axis of the machine, which comprises a plurality of circumferentially spaced insulating pieces extending longitudinally of the stator, each of said insulating pieces including a longitudinally extending heel portion secured within a complementary configured recess extending longitudinally within the body of the stator element such that said insulating pieces project inwardly from said inner surface of the stator element to establish slotlike spaces receiving the winding conductors, the radially inner end portions of said insulating pieces being provided with tapered lateral projections engaged respectively with like tapered portions of the conductor winding located between adjacent insulating pieces.

5. An arrangement as defined in claim 4 for securing the conductors of a distributed winding in place on the stator element of a dynamoelectric machine wherein each said insulating piece includes a middle portion of rectangular cross section from one side of which said tapered lateral projections extend and from the other side of which said heel portion projects.

6. An arrangement as defined in claim 5 for securing the conductors of a distributed winding in place on the stator element of a dynamoelectric machine wherein the said radially inner end portions of said insulating pieces terminate flush with the radially inward ends of the conductor winding portions located between the insulating pieces.

* * * * *